United States Patent
Kiedrowski et al.

[15] 3,690,010
[45] Sept. 12, 1972

[54] MATRIX SELECTOR FOR TIRE CASINGS

[72] Inventors: Hugh P. Kiedrowski; Merrill K. Eriksen, both of Lodi, Calif.

[73] Assignee: Super Mold Corporation

[22] Filed: Oct. 6, 1967

[21] Appl. No.: 673,505

[52] U.S. Cl. .............................. 33/174 R, 33/143 D
[51] Int. Cl. ............................................... G01b 5/08
[58] Field of Search ...................... 33/174 R, 143 D

[56] References Cited

UNITED STATES PATENTS 2,636,277   4/1953   Hawkinson .............. 33/143 D
3,007,251   11/1961   Rawls ................... 33/143 D X

*Primary Examiner*—Leonard Forman
*Assistant Examiner*—Dennis A. Dearing
*Attorney*—Lothrop & West

[57] ABSTRACT

A matrix selector measures tire casings both as to diameter and as to cross sectional width and has a mechanism for quickly mounting and sustaining a tire casing in a predetermined position and for then automatically contacting the tread surface and the side wall surface of the casing. This provides two coordinates which at their intersection afford an indication on a chart of the size of matrix to be utilized in recapping or retreading the tire casing.

11 Claims, 10 Drawing Figures

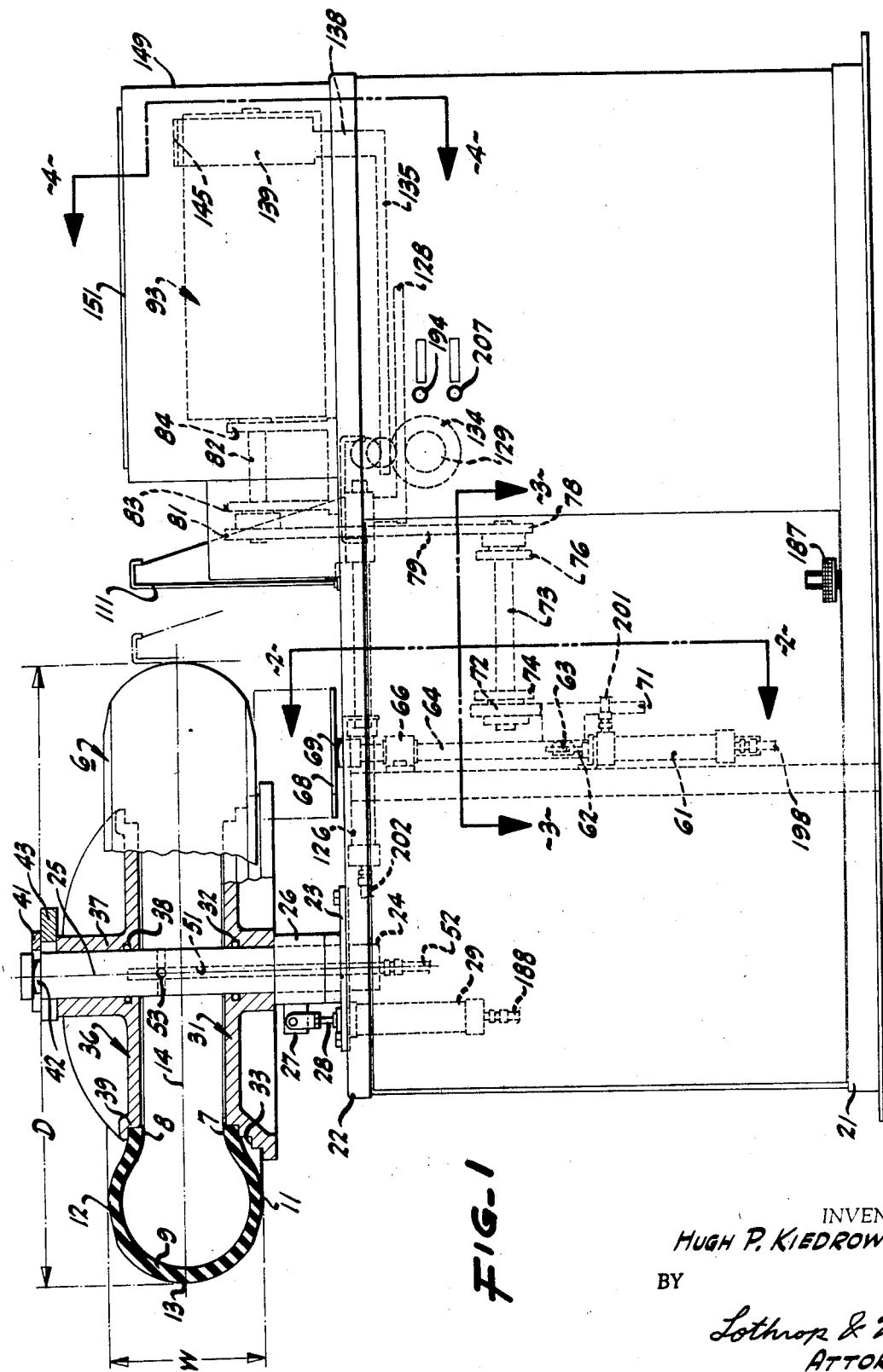

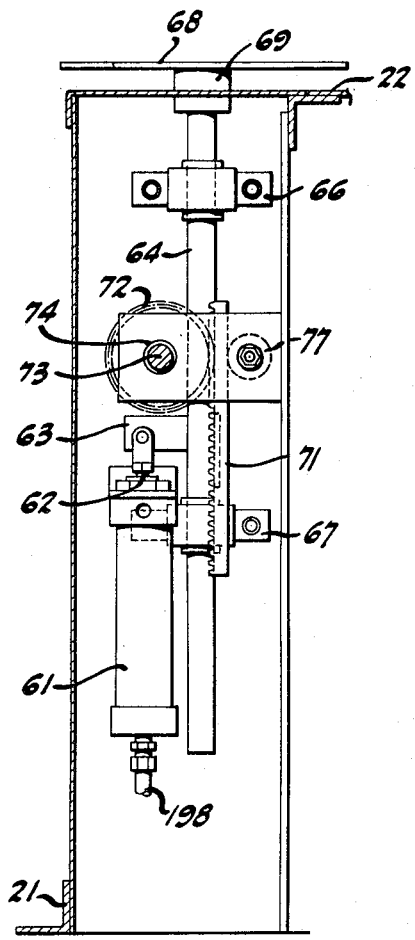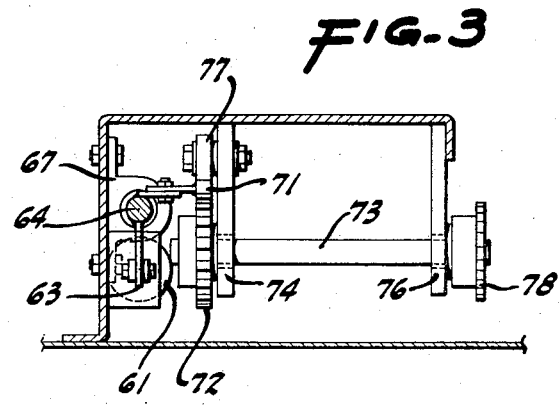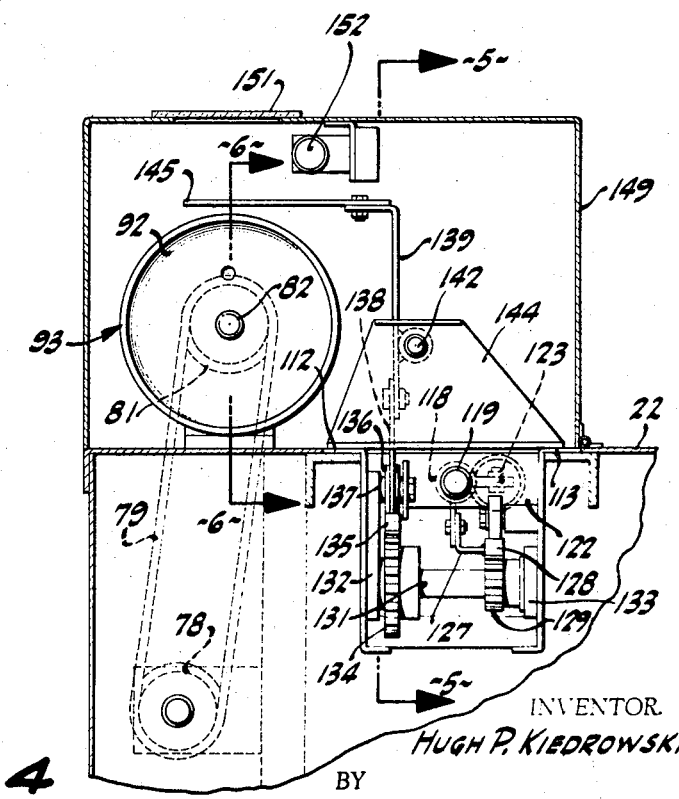

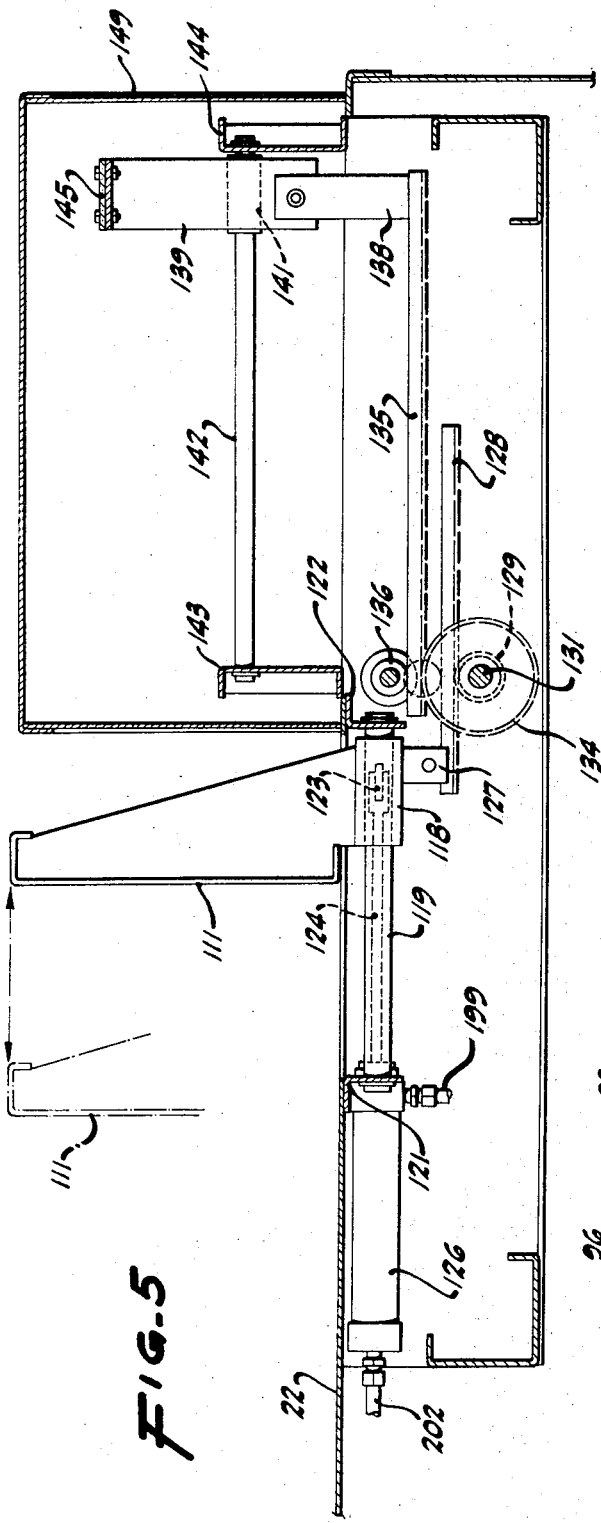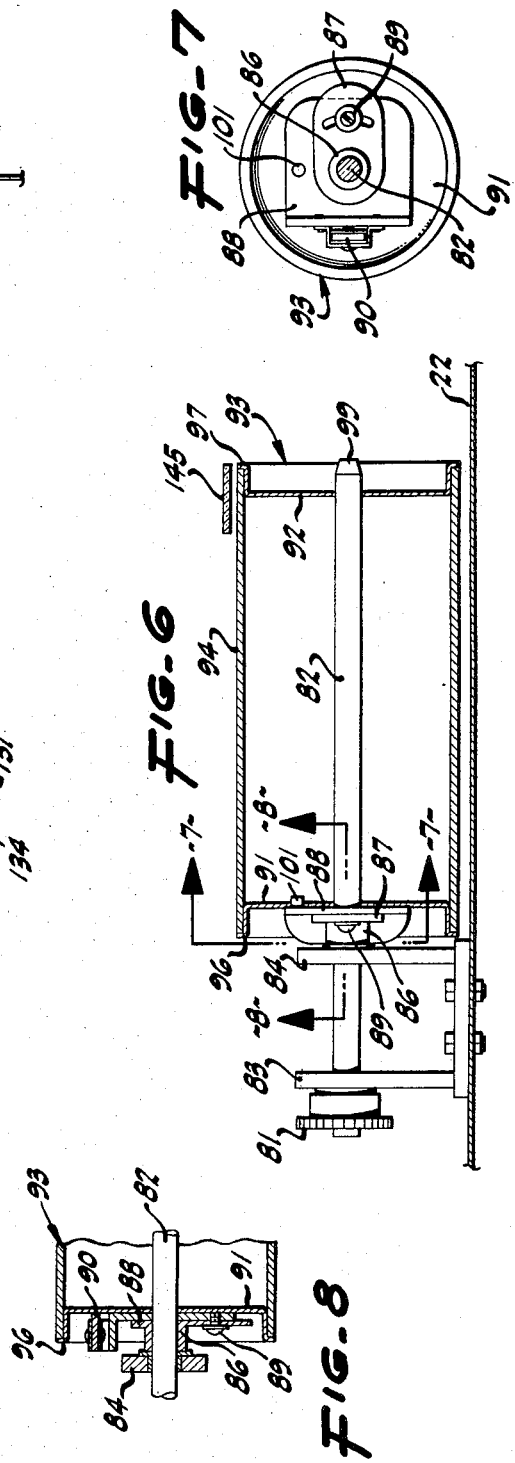
INVENTOR.
HUGH P. KIEDROWSKI
BY
Lothrop & West
ATTORNEYS

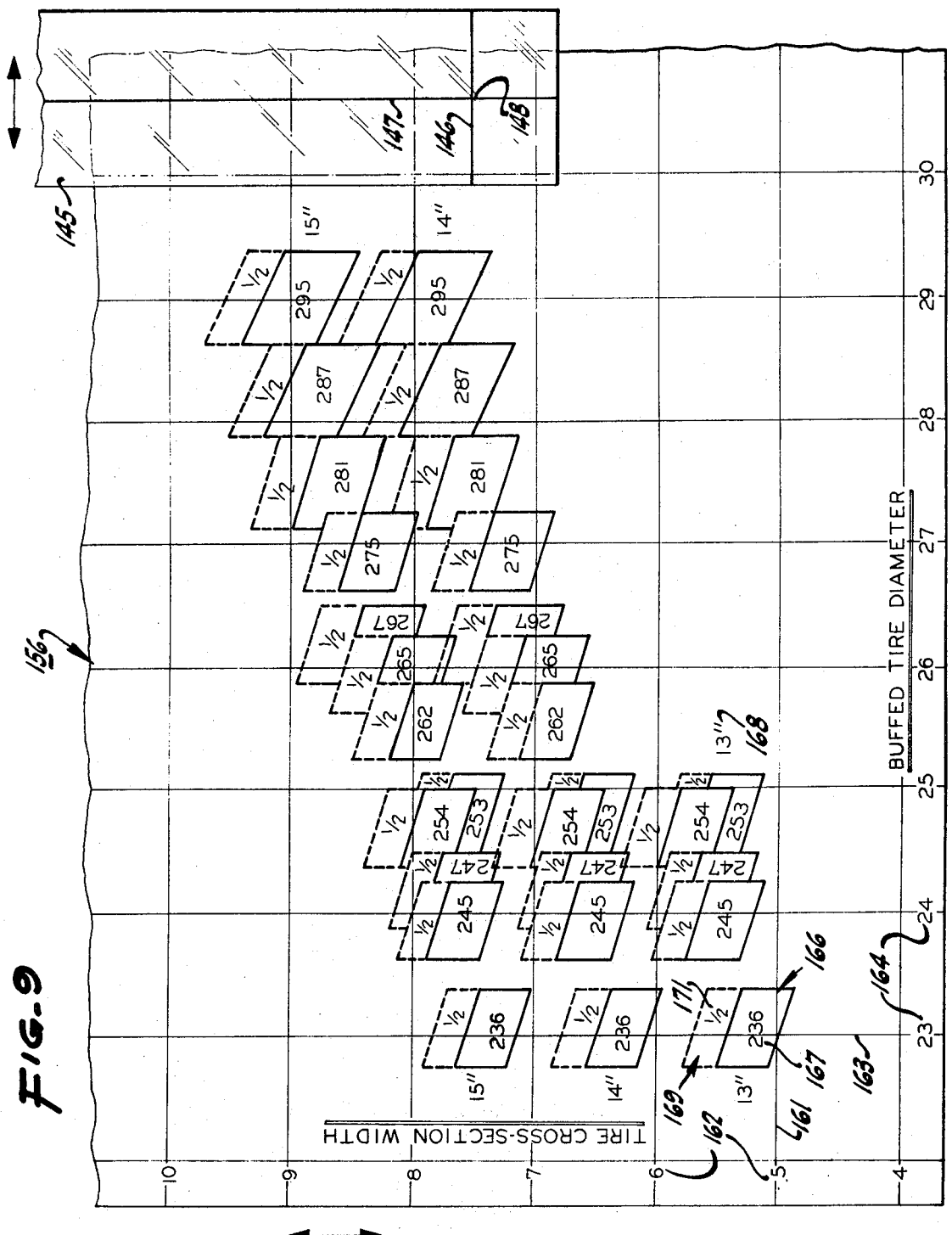

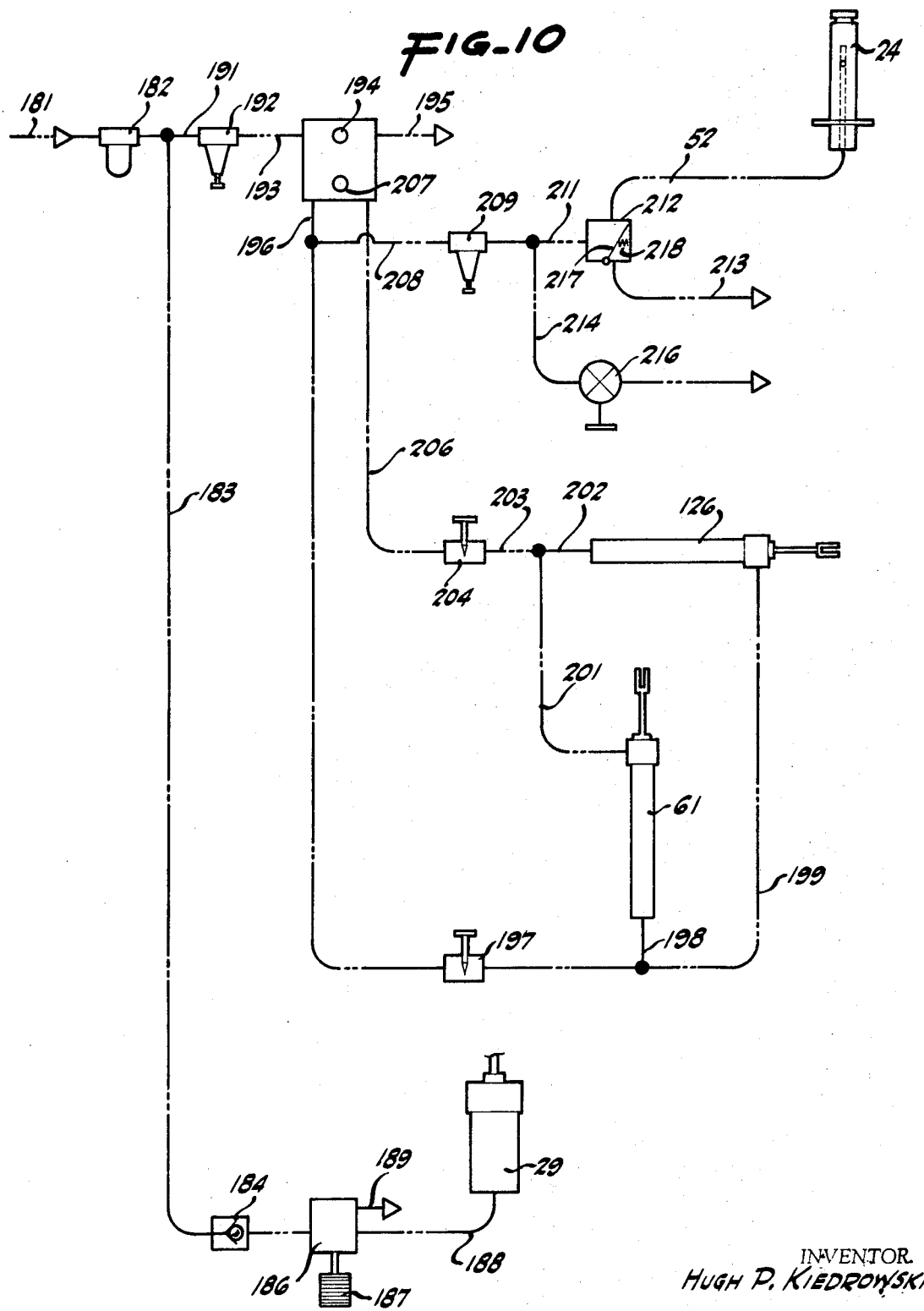

MATRIX SELECTOR FOR TIRE CASINGS

My invention relates to devices especially useful in measuring tires, particularly pneumatic automotive tires, and particularly prior to subjecting the tires, or preferably tire casings, to a recapping or retreading process.

Tire casings, after the tread has been worn, are customarily subjected to a recapping or retreading operation. This involves positioning of camelback on the suitably prepared tire casing and the subsequent subjection of the casing and camelback to a vulcanizing operation in a mold. Various matrices are provided for use in the vulcanizing mold, and these are chosen according to the size of the casing being recapped. The removable matrices have appropriate tread configurations therein and are especially contoured both as to circumference and as to tire casing cross section. When a particular tire casing and camelback have been treated in the mold with the appropriate matrices the resulting refinished tire is of the proper shape and configuration. Since tire casings vary a great deal in their nominal diameter as well as their actual diameter after buffing or other preliminary treatment and also vary a good deal in cross section both nominally and actually, and since rim widths on which the casing beads fit likewise vary, it is of considerable importance to select appropriate ones of the usual store of matrices available for recapping or retreading. Matrix selection is usually done by individual measurement with the choice being left up to an individual operator. This is relatively slow and, in the hands of unskilled operators, affords too much leeway as sometimes the improper matrices are chosen.

It is therefore an object of the invention to provide a matrix selector for tire casings which will automatically and accurately indicate to the operator the particular matrix or matrices which should be used in connection with the specific tire casing undergoing reconstruction.

Another object of the invention is to provide a matrix selector which can readily be utilized with casings which vary substantially in cross sectional dimension as well as in diameter and which are designed to fit rims of varying widths.

Another object of the invention is to provide a matrix selector for tire casings in which the mechanism can readily be altered to take care of changes in matrix patterns and designs and configurations from time to time.

Another object of the invention is to provide a matrix selector which will accommodate virtually all of the rim, diameter and cross sectional variations encountered in the usual run of tire casings.

Another object of the invention is to provide a matrix selector which operates at least semi-automatically but does so in a resilient or yielding fashion in order to avoid any possibility of damage.

Another object of the invention is in general to provide an improved matrix selector for tire casings to provide improved results.

Other objects together with the foregoing are attained in the embodiment of the invention described in the accompanying description and illustrated in the accompanying drawings, in which:

FIG. 1 is a side elevation of a matrix selector pursuant to the invention with portions broken away to disclose the interior construction on a vertical median plane;

FIG. 2 is a cross section, the plane of which is indicated by the line 2—2 of FIG. 1;

FIG. 3 is a cross section, the plane of which is indicated by the line 3—3 of FIG. 1;

FIG. 4 is a cross section, the plane of which is indicated by the lines 4—4 of FIG. 1;

FIG. 5 is a cross section, the plane of which is indicated by the line 5—5 of FIG. 4;

FIG. 6 is a cross section, the plane of which is indicated by the line 6—6 of FIG. 4;

FIG. 7 is a cross section, the plane of which is indicated by the line 7—7 of FIG. 6;

FIG. 8 is a cross section, the plane of which is indicated by the line 8—8 of FIG. 6;

FIG. 9 is a plan to an enlarged scale showing a typical indicia sheet in development together with a portion of the pointer; and FIG. 10 is a diagram disclosing the piping connections of the structure.

While the matrix selector of the invention can be embodied in a number of different ways to accommodate tire casings and comparable structures of widely varying constructional characteristics, shapes and dimensions, it has successfully been incorporated in a commercial version as shown herein for use in connection with a typical tire casing 6. This casing is generally of toroidal configuration and has a pair of beads 7 and 8 connected by an intervening carcass 9. Certain lateral areas of the carcass, such as 11 and 12, are generally referred to as the side walls thereof, whereas the central, peripheral portion 13 of the carcass is referred to as the tread portion thereof. The casing 6 is generally symmetrical about a central plane indicated by the axis 14. While in new condition the tread portion 13 is relatively thick and may have a pattern and substantial shoulders, these have been removed either by normal wear of the tread or by previous buffing so that the configuration of the casing when it is ready for retreading is substantially as shown in FIG. 1. That is, when ready for subsequent treatment, the casing 6 has a diameter D and has a cross-sectional width W. These dimensions are those utilized for the selection of appropriate matrices for the retreading operation.

The matrix selector itself includes a frame 21 designed to rest on the floor and made up of appropriate supporting shapes and enclosing sheets to provide an elevated table 22 at a convenient height. Secured to the table adjacent one end is the base 23 of an upright spindle 24 extending along a vertical axis 25 normal to the plane 14. The spindle 24 is a circular cylinder and receives a lower collar 26 having an extension 27 to which the piston 28 of an actuating cylinder 29 is connected. The cylinder is mounted on the frame 21, and the piston is effective to slide the collar 26 on the spindle. Thus, whenever the cylinder 29 is actuated the collar 26 follows its actuation in an appropriate direction.

Resting freely on the collar 26 is a lower disk 31 having an O-ring seal 32 or the like around its inner periphery to preclude air leakage between the lower disk and the spindle. The outer periphery of the lower disk is provided with a plurality of steps 33, each of which is designed to receive the bead of a casing of a corresponding diameter.

In a somewhat comparable fashion, there is provided for sliding engagement with the spindle 24 an upper disk 36 having a hub 37 of substantial extent enclosing an O-ring 38 or comparable seal to preclude air leakage between the hub 37 and the spindle 24. Since the upper disk 36 is one of a family of different size disks, it is provided with only one step 39 for the reception of only one diameter of casing bead.

While the upper disk is readily telescoped over the spindle 24, it is held against removal by a C-clip 41 removably fitting into a groove 42 on the upper end of the spindle. Furthermore, since the particular location of the upper disk 36 with respect to the table 22 may be varied from time to time, it is also feasible to insert a U-spacer 43 between the upper end of the hub 37 and the clip 41.

In the use of this much of the mechanism and in order to mount a casing, the machine is prepared by removing the upper disk, the spacer 43 and the clip 41. The collar 26 is in abutment with the base 23 since there is no pressure exerted by the cylinder 29. With the parts in this position a suitable casing, as shown, is positioned over the upstanding spindle and comes to rest on the appropriate one of the shoulders on the lower disk 31. Thereafter the upper disk 36 is put into position, a spacer 43 (if necessary) is positioned, and the clip 41 is positioned as well. The parts are held in generally assembled relationship although the upper plate 36 may be in any one of many positions along the spindle, depending upon the stiffness of the tire casing.

At this time the tire casing may not be firmly seated on the shoulders of either the upper or lower disks. To make sure that seating does occur and preferably in an air-tight fashion, the cylinder 29 is then actuated. This lifts the collar 26 and the lower disk 31 toward the upper disk 36, which cannot move upwardly. The lower disk movement continues until such time as both of the beads 7 and 8 seat in their respective shoulders. Sometimes the lower plate must rise sufficiently so that the beads themselves come into immediate contact and assist in pressing each other into their respective grooves. If, however, the beads both seat tightly before the collar 26 has risen fully, then there is no reason to complete the upward stroke of the collar 26.

Since the dimensions of the casing are of importance only when the casing is inflated and has its proper configuration, the spindle 24 is provided with a central bore 51 having a connection 52 at its lower end to a source of air under pressure. The bore 51 communicates with cross bores 53 opening to the space between the upper and lower plates 31 and 36, so that when air pressure is exerted on the connector 52 air flows into the interior space between the upper and lower plates and also inflates the attached or mounted casing. The tendency is to spread the plates apart, and the upper plate 36 necessarily stops against the slip 41 or against the intervening spacer 43, if one is used, whereas the lower collar 26 stops when it abuts the base 23. By providing appropriate spacers 43, the precise position of the shoulders relative to each other can be set so that the beads 7 and 8 take their proper positions apart just as they do on a corresponding wheel rim. With normal inflation pressure; for example, 20 pounds per square inch, the casing then assumes its correct and proper configuration and assumes its proper cross-sectional width W and its over-all diameter D.

Pursuant to the invention, means are provided for measuring the diameter and width when the casing has been appropriately mounted in a fixed or predetermined position and has been distended to its proper configuration. Mounted within the frame is a pneumatically expansible cylinder 61 having a piston rod 62 therein. At its upper end the rod is connected to a fin 63 outstanding from a plunger 64 confined to sliding movement in bearings 66 and 67 secured to the frame. At its upper end the plunger 64 carries a generally planar plate 68 mounted on a plunger hub 69 so that the plate 68 can be moved upwardly by extension or lifting of the piston rod 62 until such time as the plate comes into abutment with the side wall of the positioned casing. This operation is accomplished by air under pressure within the cylinder 61 effective to move the plate 68 upwardly with just sufficient force so that it contacts quite gently against the side wall of the casing. The plate does not displace or distort the casing since the casing is subject to an interior pressure of a superior amount.

In order to transmit the movement of the plunger 64 for indicating purposes, the plunger is provided with a linear rack 71 adapted to engage a gear 72 on a cross shaft 73 mounted in the frame by suitable bearings 74 and 76. To ensure engagement of the rack with the gear, a backing roller 77 is mounted on the frame in abutment with the smooth side of the rack 71. The cross shaft 73 at one end carries a sprocket 78 around which a chain 79 is entrained. The chain also engages a sprocket 81 at one end of a drum shaft 82 carried in bearing plates 83 and 84 so as to leave a large portion of the drum shaft 82 overhung or cantilevered. Secured on the shaft 82 adjacent the bearing plate 84 is a hub 86 having a radial arm 87 adjustably held in rotational engagement with a centralizing arm 88 by a screw 89 passing through an arcuate slot. A magnet 90 is fixed on the centralized arm 88.

Designed to slip over the cantilevered portion of the shaft 82 are the heads 91 and 92 of a drum 93, the heads being connected by a rolled indicia sheet 94 forming part of the drum and supported on and confined between flanges 96 and 97 of the drum heads 91 and 92. The heads are easily passed over the tapered end 99 of the shaft 82. The head 91 is of a magnetic material such as iron. When the drum is axially slid into operating position the magnet 90 holds the drum against axial dislodgment except by a superior force. At the same time the drum is indexed and prevented from rotational slip by a lug 101 projecting from the centralizing arm 88 into a hole in the drum head 91. The drum 93 can readily be removed and can be replaced by another drum by simple manual operation, although the magnet is strong enough to hold the drum in indexed and adjusted polar position for ordinary operation.

The drum in use is indexed and bears a correct polar relationship to the position of the side wall plate 68. Since the travel of the plate 68 is not very great, usually less than the desired circumference of the drum sheet 94, the relationship between the rack 71 and the gear 72 and, if desired, the relationship between the sprockets 78 and 81 can be such as to afford any desired multiplier, either increasing or decreasing, between the total motion of the plate 68 and a complete rotation of the drum 93.

In a somewhat comparable fashion, a tread abutment plate 111 is mounted for translational movement along ways 112 and 113 (FIG. 4) of the table 22, so that the plate 111 can move toward and away from the mounted casing. The plate 111 at its lower portion is provided with a sleeve 118 adapted to slide on a rod 119 anchored at its opposite ends in brackets 121 and 122 on the main frame. The tube 118 carries a fin 123 to which the piston rod 124 of a cylinder 126 is secured. The cylinder itself is mounted on the bracket 121. Actuation of the cylinder 126 produces rectilinear translation of the plate 111 between the positions shown by full and dotted lines in FIG. 5. In this fashion the plate 111 can be brought up to the distended tread portion of the mounted casing, the pressure exerted by the plate 111 being slight with respect to the pressure within the casing. A resilient, gentle contact is made and the casing is not unduly distorted or changed in dimension D.

The motion of the plate 111 is transmitted through a fin 127 depending from the sleeve 118 and connected to a rack 128. This in turn engages a gear 129 on a cross shaft 131 mounted in appropriate bearings 132 and 133 on the frame. The shaft 131 also carries a gear 134 preferably of different diameter than the gear 129 and meshing with another rack 135 backed up by an engagement wheel 136 mounted on the frame by a suitable bearing 137. The rack 135 adjacent one end has an upstanding fin 138 connected to a pointer carrier 139. A sleeve 141 rides on a stationary rod 142 mounted at its opposite ends in brackets 143 and 144 upstanding from the framework and guides the pointer carrier in a linear path.

Secured to the pointer member 139 is a pointer 145 preferably of transparent material and, as shown in FIG. 9, having cross hairs 146 and 147 affording a datum point 148 at their intersection for the purpose of reading indicia on the subposed drum 93. A housing 149 encloses most of the drum mechanism and has a reading window 151 in its upper surface so that a user can look through the window 151 and through the transparent portions of the pointer to read the relationship of the datum point 148 to the subjacent indicia sheet 94 of the drum. An electric light 152 is provided to facilitate reading.

An indicia sheet 156, typical of a variety of such sheets, is shown in FIG. 9. When in developed, flat position the sheet 156 appears substantially as shown in that figure with abscissae 161 having indicia 162 indicating the dimension W of the buffed tire casing and having ordinates 163 bearing indicia 164 indicating the diameter D of the buffed casing.

Also appearing on the chart or indicia sheet 156 are parallelograms 166 having indicia 167 indicating a particular retreading matrix by its normal, numerical designation, the parallelograms 166 appearing in locations having to do with the particular nominal diameter of the wheel on which the casing fits, as evidenced by indicia 168.

Since it is sometimes the practice to utilize spacers in connection with the various matrices, each of the parallelograms 166 is augmented by a parallelogram 169 having an indicium 171 indicating a spacer-matrix combination. The various parallelograms 166 are disposed on the matrix sheet in set locations so that when the pointer is moved axially along the drum with the movement of the tread abutment plate 111 and when the drum is rotated with the movement of the side wall abutment plate 68, the datum point 148 is brought into superposition with an appropriate one of the parallelograms 166. The user, therefore, need but read the designated number, such as the indicium 167, in order to determine immediately what matrix to use with the particular casing that has just been measured.

Since the matrix sheet 94 is removable it can be changed from time to time as tire casing contours and diameters vary. This is usually a process which does not occur except rarely so that a single matrix sheet will serve for a protracted period of time.

In order to make the operation of the structure as nearly automatic as is beneficial, and since air under pressure is normally available where tires are handled, I preferably provide an air piping arrangement as shown in FIG. 10 to operate the various instrumentalities appropriately. Air from a suitable supply comes into the system in a conduit 181 and passes through the customary filter 182 into a line 183 having a check valve 184 therein and extending to a foot valve 186. This has a treadle 187 for user operation and is customarily spring-returned. When the treadle 187 is not depressed the cylinder 29 is connected through a pipe 188 directly to an atmospheric exhaust 189, thus leaving the collar 26 and the lower disk 31 in their lowermost position. However, when the treadle 187 is depressed, access to atmosphere through the exhaust 189 is cut off and the cylinder 29 is connected directly to the line 183 through the check valve 184. Full line pressure is thus exerted on the cylinder 29 until such time as the foot treadle 187 is released. Should the air supply fail while the treadle is depressed, the pressure in the cylinder 29 does not drop since the check valve 184 shuts.

Line pressure is usually not needed for the other instrumentalities. The line 183 thus has a branch 191 extending through a pressure regulator 192 which reduces the line pressure to a lower value; for example, 40 pounds per square inch. The regulator 192 is connected by a line 193 to a manually operated, spring-returned valve 194 normally affording access through a line 195 to the atmosphere from a line 196 extending through a needle valve 197 to a connection 198 at the end of the cylinder 61. A connecting lead 199 is joined to one end of the cylinder 126. The other ends of the cylinders 61 and 126 are respectively joined by pipes 201 and 202 to a line 203 in which a needle valve 204 is situated. A connection 206 joins to another manually operated, spring-returned valve 207 normally affording access to the atmosphere through the line 195 from the connection 206.

When the valve 194 is manually depressed, the valve 207 being undisturbed, air flows at a rate regulated by the needle valve 197 into one end of both the cylinders 61 and 126, the exhaust from the other end thereof flowing at a rate regulated by the needle valve 204 to the atmosphere through the valve 207 and the line 195. The plates 68 and 111 are thus brought into contact with the casing, which has previously been positioned by depression of the treadle 187.

When the valve 194 is released, pressure in the line 196 and the corresponding end of the cylinders 61 and 126 drops to atmospheric and then when the valve 207 is manually depressed the other end of the cylinders is supplied with pressure at a rate controlled by the needle valve 204 and the plates 68 and 111 are moved away from casing contacting position to the other end of their travel ready for subsequent use.

Previous to the casing measurement the casing is inflated. Preferably this is done by manual operation of the valve 194 while the treadle 187 is depressed. To accomplish this purpose, the line 196 is provided with a branch line 208 connected to a pressure reducer 209 dropping the pressure to a suitable inflation pressure; say, 18 pounds per square inch. From the reducer 209 a line 211 connects to a special valve 212 having an outlet to which the connection 52 to the casing interior is joined. The valve 212 also has another outlet leading through a line 213 to the atmosphere. A bleed line 214 is joined to the line 211 and leads to the atmosphere through a needle valve 216.

When the valve 194 is actuated to move the plates 68 and 111 toward the casing, air simultaneously starts to flow into the line 211. Some of this air bleeds to the atmosphere through the valve 216, but the major portion flows to the valve 212 and moves a barrier 217 therein against a spring 218 to block flow to the line 213 and to permit flow through the connection 52 to the casing interior. The relationships of the various valve restrictions and areas and pressures are such that the casing is inflated and spreads the disks 31 and 36 apart despite continued depression of the treadle 187 and prior to the time that the plates 68 and 111 meet the distended casing.

When the measurement has been made, the valve 194 is released and the valve 207 is actuated, the treadle 187 meanwhile having been released. Air flows from the line 196 to the atmosphere through the pipe 195 thus discharging the connected ends of the cylinders 61 and 126 and no longer supplying the regulator 209. Since the bleed line 214 is still open, the pressure in the line 211 and in the connector 52 begins to drop. The spring 218 is then enabled to shift the barrier 217 directly joining the connection 52 to the atmospheric line 213, thus quickly deflating the casing and permitting its removal from the machine.

What is claimed is:

1. A matrix selector for tire casings comprising a frame, means on said frame for supporting a tire casing in a predetermined position, a drum having a portion carrying indicia, means for mounting said drum on said frame for rotation about an axis, a tread abutment plate, means for moving said tread abutment plate toward and away from the tread portion of a tire casing on said supporting means, a pointer, means for mounting said pointer on said frame for movement adjacent said drum in the direction of said axis, means for connecting said tread abutment plate and said pointer to move conjointly, a wall abutment plate, means for moving said wall abutment plate toward and away from the wall portion of a tire casing on said supporting means, and means for connecting said wall abutment plate and said drum to move conjointly.

2. A matrix selector as in claim 1 in which said supporting means includes a central spindle, a disk slidably mounted on said spindle, and means for sliding said disk on said spindle.

3. A matrix selector as in claim 2 in which a second disk is removably mounted on said spindle.

4. A matrix selector as in claim 2 in which said sliding means includes a fluid-actuated cylinder and a control therefor on said frame.

5. A matrix selector as in claim 1 in which said means for connecting said tread abutment plate and said pointer includes a motion multiplying mechanism.

6. A matrix selector as in claim 1 in which said indicia-carrying portion of said drum is changeable.

7. A matrix selector as in claim 1 in which said tread abutment plate moving means and said wall abutment plate moving means are connected for substantially simultaneous operation.

8. A matrix selector as in claim 1 in which said tread abutment plate moving means and said wall abutment plate moving means are resilient.

9. A matrix selector as in claim 2 including means for inflating a tire casing on said supporting means by a connection extending through said spindle.

10. A matrix selector as in claim 9 in which said inflating means exerts a force on said slidable disk superior to the force exerted thereon by said sliding means.

11. A matrix selector as in claim 9 in which said inflating means distends a tire casing on said supporting means with a force superior to the forces exerted on said tire casing by said tread abutment plate and said wall abutment plate.

* * * * *